H. SLATER.
HIGH PRESSURE VALVE.
APPLICATION FILED AUG. 11, 1913.
1,143,236. Patented June 15, 1915.
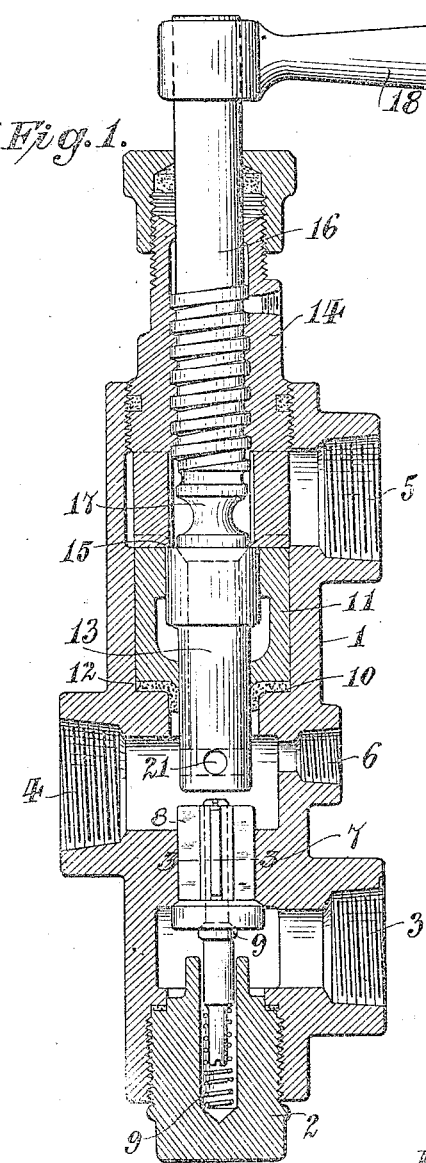
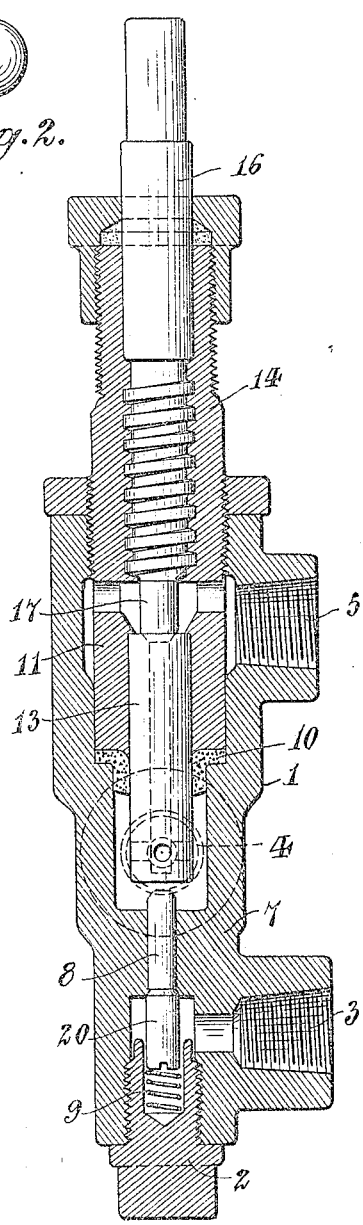
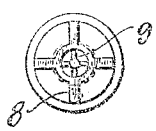
WITNESSES
INVENTOR
Harvey Slater
BY
ATTORNEYS ot
UNITED STATES PATENT OFFICE.

HARVEY SLATER, OF CHICAGO, ILLINOIS, ASSIGNOR TO CHARLES F. ELMES ENGINEERING WORKS, OF CHICAGO, ILLINOIS, A CORPORATION OF ILLINOIS.

HIGH-PRESSURE VALVE.

1,143,236.

Specification of Letters Patent. Patented June 15, 1915.

Application filed August 11, 1913. Serial No. 784,074.

*To all whom it may concern:*

Be it known that I, HARVEY SLATER, a citizen of the United States, residing in Chicago, in the county of Cook and State of Illinois, have invented certain new and useful Improvements in High-Pressure Valves, of which the following is a specification.

My invention relates to valves for controlling high pressures and particularly to valves employed in controlling hydraulic machines, such as rams and presses which are subjected to extremely high pressures.

Heretofore great difficulty has been experienced with valves subjected to high pressure duty on account of the tendency of such valves to leak, and if made large enough to operate easily under working conditions, the difficulty of controlling the same readily and rapidly, especially if the working parts are constructed to fit tightly, is greatly increased. The wear on such valves has also proved excessive, especially if the liquid employed contains grit or sediment of any kind, and consequently, as is well known, it has become common practice to employ a plurality of valves for high pressure duty, one of said valves to control the inlet and the other to control the outlet or release.

One of the primary objects of my invention is to provide a high pressure valve which can be controlled by the movement of a single operating handle or lever in such a manner as to open either the inlet or the exhaust or to close all of the passages through the valve gradually in each case, without fine regulation and control and without the exercise of more than ordinary precaution on the part of the operator.

A further object of my invention is to provide a construction in which a limited amount of independent movement is provided between certain parts of the valve which permits the valve mechanism to be controlled easily, and at the same time, permits a certain amount of automatic adjustment of the valve parts.

A further object of the invention is to provide means whereby the pressure against initial movement of the valves may be reduced.

The various other objects of the invention will be more fully set forth in the following description of one form of valve embodying my invention, together with certain modifications thereof, which consists in the new and novel features of construction and combinations of parts hereinafter set forth and claimed.

In the drawings: Figure 1 is a longitudinal sectional view through a preferred form of my invention particularly adapted for extreme high pressure work, and Fig. 2 is a similar view of a modified construction particularly adapted for use in smaller valves. Fig. 3 is a transverse sectional view on the lines 3—3 of Fig. 1.

Referring particularly to the construction illustrated in Fig. 1 of the drawings, there is shown a casing 1, having one end closed by a screw plug 2, which casing has a pressure inlet 3, a machine supply port 4 and an exhaust 5, disposed in order longitudinally of the casing. This casing may also have a port 6 for connection with a pressure gage or other suitable indicator. The bore of the casing between the inlet 3 and the port 4 has an apertured partition 7, forming a guide and seat for the main inlet controlling valve 8, which valve has extending therethrough one of the alined stems of a pilot valve 9, the other stem of which is guided in the plug 2 and is engaged by the compression spring 9, which acts upon the pilot valve and through the pilot valve on main valve 8, tending to maintain the same in closed position.

The portion of the bore of the casing 1 between the port 4 and exhaust 5 is restricted to form a shoulder 10, and disposed in this portion of the bore is a guiding sleeve 11 bearing upon a packing 12, positioned between the sleeve 11 and the shoulder 10. Slidably mounted in the sleeve 11 and adapted to be brought into engagement with the pilot valve 9 and main valve 8 is a sliding piston 13, having a passageway 21 extending therethrough and adapted to place the port 4 in fluid communication with the outlet or exhaust 5. A bonnet 14 is threaded into the end of the casing opposite the plug 2, the lower end of which bonnet provides a seat 15 forming a stop for the upward movement of plunger or piston 13 but it is obvious that the sleeve 11 may be made integral or otherwise fixed to the bonnet 14 so as to be removable therewith as shown in Fig. 2. Extending through the bonnet 14 and in threaded engagement therewith is a screw rod 16, the lower end of which is formed into an exhaust controlling valve 17, adapted to close fluid communication through the passageway 21. The rod 16 may be actuated by any suitable means, and for this purpose a manually actuated handle 18 is provided. The length of the piston 13 is so proportioned that the main valve and pilot valve 9 may move into closed position before the piston engages with the seat 15.

Referring particularly to the modified form as shown in Fig. 2, the pilot valve shown in Fig. 1 is omitted, and a stem 20 from the main valve 8 is engaged by the spring 9, which tends to maintain the main valve normally in closed position.

With the parts in the position indicated in Fig. 1, the valves 8 and 9 are in position for closing communication between the inlet 3 and machine supply port 4. The piston 13 is in engagement with its seat 15, and the valve 17 is in position for closing communication between the port 4 and exhaust 5. Rotating the handle 18 in a direction to move the screw rod 16 downward moves the plunger 13 off its seat, and into engagement with the pilot valve 9, unseating the same and permitting the equalization of pressure on opposite sides of the main valve 8 and the continued movement of the plunger 13 will act on the valve 8 to unseat the same, permitting the full head of pressure to pass the main inlet controlling valve. At this time, the valve 17 is in position, closing communication between the port 4 and exhaust 5.

The actuating of the handle to move the screw rod 16 in the opposite direction will permit the pressure from the supply port 3 to act on the plunger to move the same toward its seat, thus permitting the inlet valve to be seated by the compression spring 9. This inlet valve is completely seated, preferably just before the plunger 13 reaches its seat, and at this time, the valve 17 is in position closing the passageway 21. A further movement of the rod 16 permits the plunger 13 to move into engagement with its seat under the back pressure from the machine supply port, during which time the machine supply port is shut off from both the inlet and exhaust. A further movement outward of the screw rod 16 will positively lift the valve 17 from its engagement with the plunger 13, permitting fluid communication between the machine supply port 4 and the exhaust 5 through the passageway 21.

The operation of the device shown in Fig. 2 is similar to the form of device shown in Fig. 1, except that the plunger 13 engages directly with the main inlet controlling valve 8 to open the same against the pressure from the inlet without the assistance of a pilot valve. By means of this construction, both the inlet and the outlet valve can be closed and the pressure in the machine held stationary by movement of the handle which will permit the inlet valve to close without allowing the plunger to rise against its seat on the casing; whereby the outlet valve is also held in engagement with its seat in the plunger. Since an independent stop is thus provided for the plunger, the inlet valve has an independent movement relative thereto, thus permitting the same to close automatically when the pressure against the plunger is released and allowing complete disengagement between these parts for any desired interval prior to the instant when the plunger engages with the stop or shoulder in the casing. Consequently, it is possible to pack the plunger in a simple and effective manner, since the packing is firmly held between the shoulder stationary with respect to the casing, and thus allowing the packing to be arranged so that the pressure from the machine will tend to make a tight joint. The pressure receiving areas, both of the inlet valve and the outlet valve, are comparatively small, so that the pressure to be overcome in the movement of these valves is correspondingly decreased.

It is obvious that various changes within the skill of the mechanic may be made without departing from the spirit of my invention, provided the means set forth in the following claims be employed.

I claim as my invention:—

1. In a valve mechanism, the combination with a casing having a machine supply port, an inlet and an exhaust, and a normally closed valve for said inlet, of a floating piston between said port and exhaust, means adapted to be moved in one direction to move said piston from an inoperative position into engagement with said inlet valve to open the same, an exhaust controlling valve operatively connected to said means, said means in one position adapted to form a stop for said floating piston in its movement out of engagement with said inlet valve and adapted to be moved into another position to permit unseating of said exhaust controlling valve.

2. In a valve mechanism, the combination with an inlet valve, of a piston adapted to engage with and move said valve in one direction to unseat the same, said piston having a movement away from said inlet valve, and having a passageway therethrough, a second valve controlling said passageway, means for holding said second valve in closed position and a port adapted to admit back pressure to said mechanism, said pressure being operable on the release of said holding means for moving said piston out of engagement with said inlet valve.

3. In a valve, a casing having a machine supply port, a pressure exhaust, and an inlet to said supply port, a valve controlling said inlet, a valve controlling said exhaust, and a floating piston disposed between said valves independently movable relative to said inlet controlling valve and having a bore placing said port in communication with said exhaust and controlled by said exhaust controlling valve, a stop for limiting the movement of the piston toward the exhaust, and manually controlled means for positively moving the exhaust controlling valve into open position.

4. A valve casing having a pressure inlet and a machine supply port, a main valve for closing communication between said inlet and port, said valve having a pilot valve for equalizing pressures on opposite sides of said main valve, said pilot valve having alined stems projecting beyond opposite sides of the main valve, means for guiding said stems, a housed spring acting on one of said guided stems to seat the pilot valve, and a plunger having a movement adapted to act on the other guided stem longitudinally thereof and on the main valve to unseat both of said valves in succession.

5. In a valve mechanism, the combination with a casing having a machine supply port, an inlet to said port, a normally closed main valve controlling said inlet, a normally closed pilot valve for equalizing pressures between said port and said inlet, an exhaust from said supply port, and a valve controlling said exhaust, of a screw rod having movement in the direction of movement of said exhaust valve to positively close said exhaust valve, and to open successively said pilot-valve and said inlet valve, said means having a material movement between the closing of the exhaust valve and the opening engagement with the pilot valve whereby there will be provided a space in the movement of the said means during which all valves are closed.

6. In a valve mechanism, the combination with a casing having a machine supply port and an exhaust, a pressure inlet to said port, a self-closing valve controlling said inlet, a housed spring acting on said valve to close the same, a sliding plunger adapted to engage said valve to actuate the same, said plunger and valve capable of movement relative to each other in the direction of the seating and unseating movement of the valve, a screw rod for holding said plunger in engagement with said valve to open the same and for holding the valve in open position against the action of said spring.

7. In a valve mechanism, the combination with a casing having a bore extending therethrough, a machine supply port, a pressure inlet and an exhaust communicating with said bore, a screw plug closing one end of said bore, an inlet controlling valve supported by said plug, a bonnet having a screw rod closing the other end, a guiding sleeve within said bore between said bonnet and said port, a floating piston guided in said sleeve and adapted to engage said inlet valve to actuate the same and an exhaust controlling valve fixed to said screw rod and adapted to actuate said piston.

8. In a valve mechanism, the combination with a casing having a bore extending therethrough provided with a machine supply port, a pressure inlet and an exhaust leading to said bore, of a screw plug closing one end of said bore, an inlet controlling valve supported by said plug, a bonnet having a screw rod closing the other end, said bonnet having a piston seat, a piston floating between said port and seat and adapted to actuate said inlet controlling valve, an exhaust controlling valve adapted to be moved by said screw rod to unseat said piston and actuate said inlet controlling valve.

9. In a valve mechanism, the combination with a casing having a bore extending therethrough, a machine supply port, a pressure inlet and an exhaust leading to said bore, of a spring pressed inlet controlling valve in said bore between said inlet and port, a floating piston in said bore having a passage-way extending therethrough for placing said port in fluid communication with said exhaust, and a manually controlled valve for said passageway adapted to move said piston into position to engage said inlet controlling valve to open the same.

10. In a valve mechanism, the combination with a casing having a machine supply port, a pressure inlet and an exhaust, of the combination, in axial alinement, of a normally closed spring pressed inlet controlling valve, a stop for said valve, a floating piston having means for placing said port in communication with said exhaust, a stop for said piston disposed between the same and said exhaust, an exhaust controlling valve, and a screw rod adapted to actuate said exhaust controlling valve to and from its exhaust closing position and to move said piston out of engagement with said stop and into engagement with said inlet controlling valve.

11. In a valve mechanism, a casing having a bore extending therethrough, an exhaust port and an outlet to said bore, a valve for said outlet, manually controlled means for holding said valve in various set positions closing said exhaust port, one end of said bore being enlarged to form a shoulder between the exhaust port and outlet, a flange packing lapping the edge of said shoulder, an insert disposed in the enlarged portion of said bore and having its inner end positioned on one flange of said packing to hold the same in place, and a plunger having a passageway therethrough providing communication between said exhaust port and outlet, said plunger being slidably mounted in said insert and movable toward and from the set positions of said valve thereby to control said passageway and said plunger having a portion extending therefrom and movable through another flange of said packing, said last named flange filling the space between said plunger and wall of the bore to prevent leaking past the outside of the plunger.

12. In a valve mechanism, a casing having a bore extending therethrough, a screw plug closing one end of said bore, an insert having a screw rod closing the other end, said casing having a machine supply port and a pressure inlet port, the bore being reduced between said ports to form a valve seat, a main valve bearing on said seat, an auxiliary valve within said main valve resiliently supported from said screw plug and removable therewith, a piston carried by said insert and removable therewith, said piston adapted to be moved by the actuation of said screw rod into position to open said auxiliary and main valves in succession, an exhaust port from said bore and a valve for controlling said exhaust port operatively connected to said screw rod.

This specification signed and witnessed July, A. D. 1913.

HARVEY SLATER.

Signed in the presence of—
M. K. K. SMITH,
J. W. SMITH.